Nov. 18, 1930.　　T. M. EYNON　　1,782,233
LIQUID LEVEL INDICATOR
Filed Feb. 25, 1924
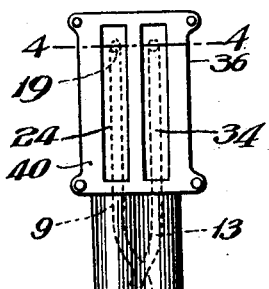
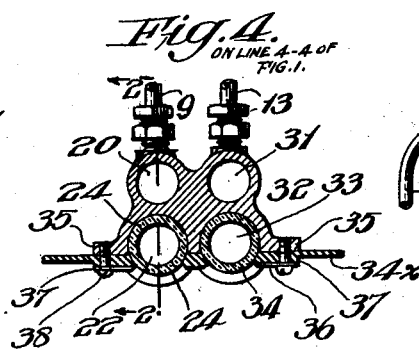
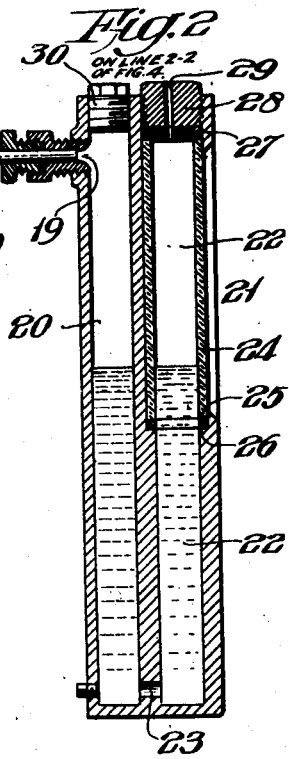
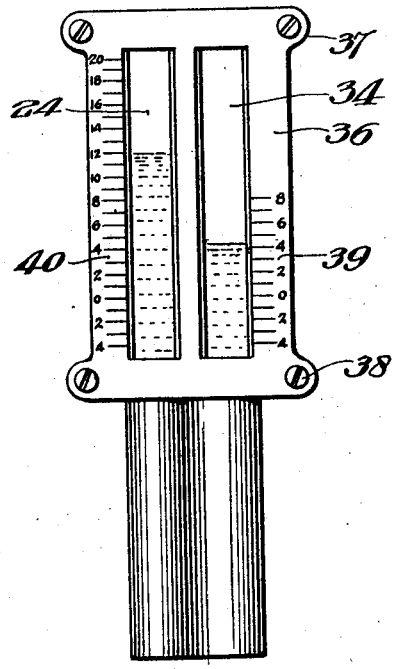
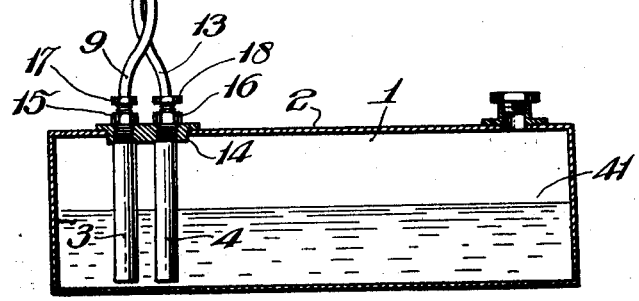
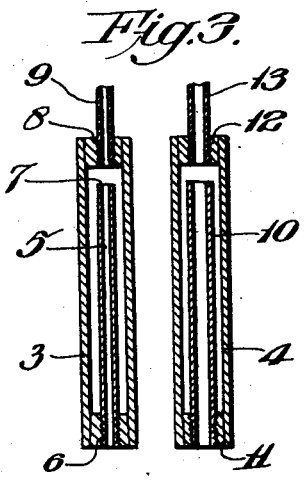
INVENTOR:
Thomas M. Eynon
BY
ATTORNEYS.

Patented Nov. 18, 1930

1,782,233

UNITED STATES PATENT OFFICE

THOMAS M. EYNON, OF PHILADELPHIA, PENNSYLVANIA

LIQUID-LEVEL INDICATOR

Application filed February 25, 1924. Serial No. 695,007.

My invention relates to a new and useful liquid level indicator wherein an indicating fluid is employed which is actuated by air pressure created by the rise and fall of the level of the liquid in a tank to which the device is applied.

My invention further relates to a novel liquid level indicator whereby the level of the liquid in the tank is ascertained not by the direct reading of a single device, but by the difference in the readings of two independent devices, operated simultaneously and applied to the same tank.

To the above ends my invention consists of two open ended tubes of different diameters enclosed in casings of the same diameter and positioned in a tank the level of the liquid in which is to be ascertained; pipes leading from said tubes to the upper, closed limbs of intercommunicating U-shaped tubes, the other limbs of said tubes being open; an indicating fluid in said U-shaped tubes; and graduated means coacting with said indicating fluid, whereby any rise and fall of the level of said fluid may be translated in terms of units to indicate the rise and fall of the level of the liquid in the tank.

It further consists of other novel features of construction and advantage, all as will be hereinafter fully set forth.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Fig. 1, represents a front elevation of a liquid level indicator, embodying my invention.

Fig. 2, represents a section on line 2—2, Fig. 4.

Fig. 3, represents on an enlarged scale a vertical, sectional view of the casings and differential tubes seen in the lower left hand portion of Fig. 1.

Fig. 4, represents a section on line 4—4 of Fig. 1.

Fig. 5, represents a front elevation of the upper portion of Fig. 1.

Referring now to the drawings, 1 designates a gasoline or other tank, having a filling opening of the usual construction. The top 2 of said tank has a pair of casings 3 and 4 therein, of the same diameter and length. In the casing 3 is located the differential tube 5, whose lower end is secured in the collar 6 positioned in the lower end of said casing and secured therein by brazing or otherwise, said tube being open at both ends and the upper end 7 terminating a short distance from the collar 8 secured in the top of the casing 3 and having secured therein the lower end of the tube 9. The casing 4 has the differential tube 10 therein, whose lower end is secured in the collar 11, which is fixedly secured in the bottom of said casing, said tube being of greater diameter and capacity than the tube 5, and having its upper end terminating a short distance from the upper collar 12, secured in the upper end of the casing 4, said collar receiving the lower end of the tube 13. The upper ends of the casings 3 and 4 may be secured to the flange 14 in the cap 2 of the tank by any suitable means, and outside of said top I provide the stuffing boxes 15 and 16, which are provided with the glands 17 and 18, which are slidably mounted on the pipes 9 and 13. The upper end of the tube 9 as seen in Fig. 2 communicates at 19, with the upper end of the chamber 20 of the U-shaped tube 21, which is also provided with the chamber 22, which communicates at its lower end with the chamber 20 through the port 23.

In the upper portion of the chamber 22, I place the glass tube 24, whose lower end rests on the gasket 25 supported on the shoulder 26. 27 designates an upper gasket contacting with the upper end of the glass tube 24, upon which is screwed the plug or closure 28 having a port 29 therein leading to the atmosphere.

The upper end of the chamber 20 is closed by the solid plug or closure 30, which is solid or imperforate. The upper end of the tube 13 communicates with the chamber 31 of the U-shaped tube 32, having the front chamber 33 provided with the glass tube 34. The chambers 31 and 33 have a communicating port at their bottom, of the same character as seen in Fig. 2. 34x designates the instrument board against the back of which abuts the flange 35. 36 designates a face plate or front plate having the flanges 37, through which pass the bolts, screws or other fastening devices 38. 39 and 40 designate the oppositely located legs or differential readings, which are provided with numbers and scales substantially as seen in Fig. 5. It will be apparent that while I have shown two casings 3 and 4 as being employed, for convenience in manufacture, a single casing may be employed having two vertical chambers therein for the reception of the differential tubes.

The operation is as follows: The casings 3 and 4 of the same volume or size and having the same displacement, are positioned in the empty tank 1, in the manner shown in Fig. 1, with the open ended inner tubes 5 and 10 of different diameters enclosed therein. The pipes 9 and 13 are intertwined for reinforcement and to insure uniformity of any change in temperature to which said tubes may be subjected, which would not be true if these tubes ran spaced from each other or in different localities. The upper ends of the tubes or pipes 9 and 13 communicate with the closed upper ends of the limbs 20 and 31 of the U-shaped tubes 21, the other limbs 22 and 33 of which are open to the atmosphere as at 29. With the lower ends of the tubes 5 and 10 and the upper ends of the limbs 22 and 33 open to the atmosphere, the air pressure is equal at both ends and the indicating fluid in the U-shaped tubes 21 stands at the same level all around. When the tank 1 is filled, the liquid first seals the lower ends of the tubes 5 and 10 and then gradually rises therein to displace the air, and the air in the pipes 9 and 13 is to that extent compressed, thus increasing the pressure of the air in the closed ends of the limbs 20 and 31. This results in a higher level of the indicating fluid in the limbs 22 and 33. Due to the smaller diameter of the tube 5, the amount of air displaced therefrom by the rise of the liquid in the tank 1 is less than that displaced from the larger tube 10. This results in a greater compression of air in the tube or pipe 13 than takes place in the tube 9, and the rise of the indicating fluid in the limb 33 (and the glass tube 34) will be greater than that in the limb 22 (and the glass tube 24). Since the rise in both said limbs is due to the rise of the liquid in the tank 1 (a fixed quantity) it follows that the difference between the heights of the indicating liquid in the limbs 22 and 33 is directly proportional to the rise of the liquid in the tank 1. For instance, if by placing ten gallons in the tank 1, the indicating fluid in the limb 33 rises two inches higher than in the limb 22, it follows that that height represents ten gallons.

It will now be apparent that my invention, being operated solely by variations of pressure or volume within the differential tubes, is entirely automatic in its operation, and that it dispenses entirely with floats in the tanks and with all mechanical connections, so there is no liability of the apparatus getting out of order after being installed in position, and owing to its great simplicity, and the absence of any mechanical connections, it can be readily installed in any standard tank without the employment of skilled labor.

I am aware that the invention may be embodied in other specific forms without departing from the spirit or essential attributes thereof, and I therefore desire the present embodiment to be considered in all respects as illustrative and not restrictive, reference being had to the appended claim rather than to the foregoing description to indicate the scope of the invention.

Having thus described my invention what I claim as new and desire to secure by Letters Patent, is:—

In a device of the character stated, a tank adapted to contain a liquid, a pair of open ended tubes of unequal internal volumetric capacity positioned within said tank, a pair of identical U-shaped indicating members having the upper ends of the rear arms thereof closed and the upper ends of the front limbs thereof open, and having indicating fluids in the lower portions thereof, and a corresponding pair of pipes of unequal diameters leading from the upper ends of said tubes to the respective upper closed ends of the rear limbs of said U-shaped indicating members.

THOMAS M. EYNON.